April 16, 1929.  B. R. BENJAMIN  1,709,553
COTTON SEPARATOR
Filed June 9, 1927   4 Sheets-Sheet 4
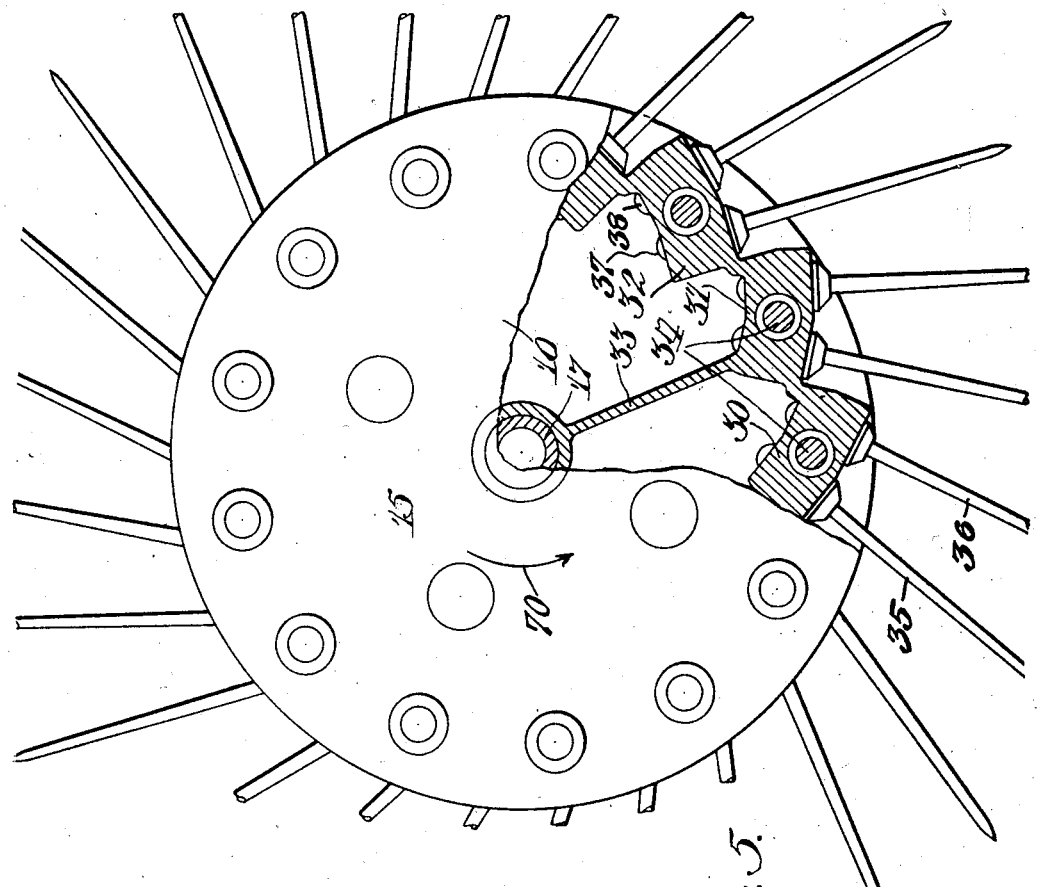
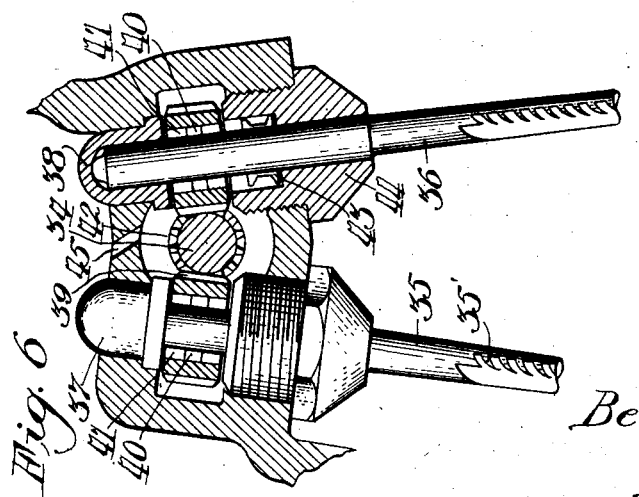
Inventor
Bert R. Benjamin.
By
Atty.

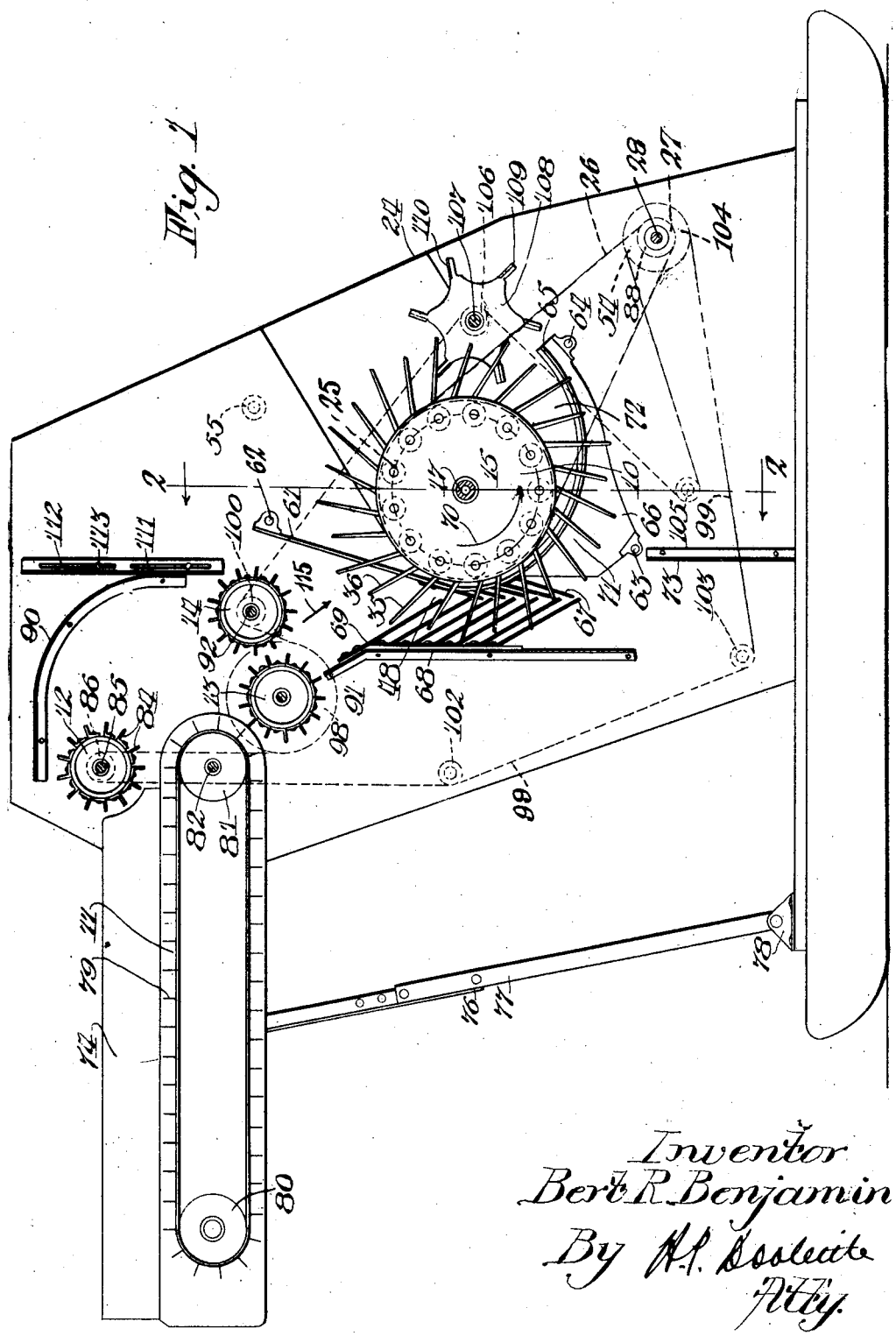

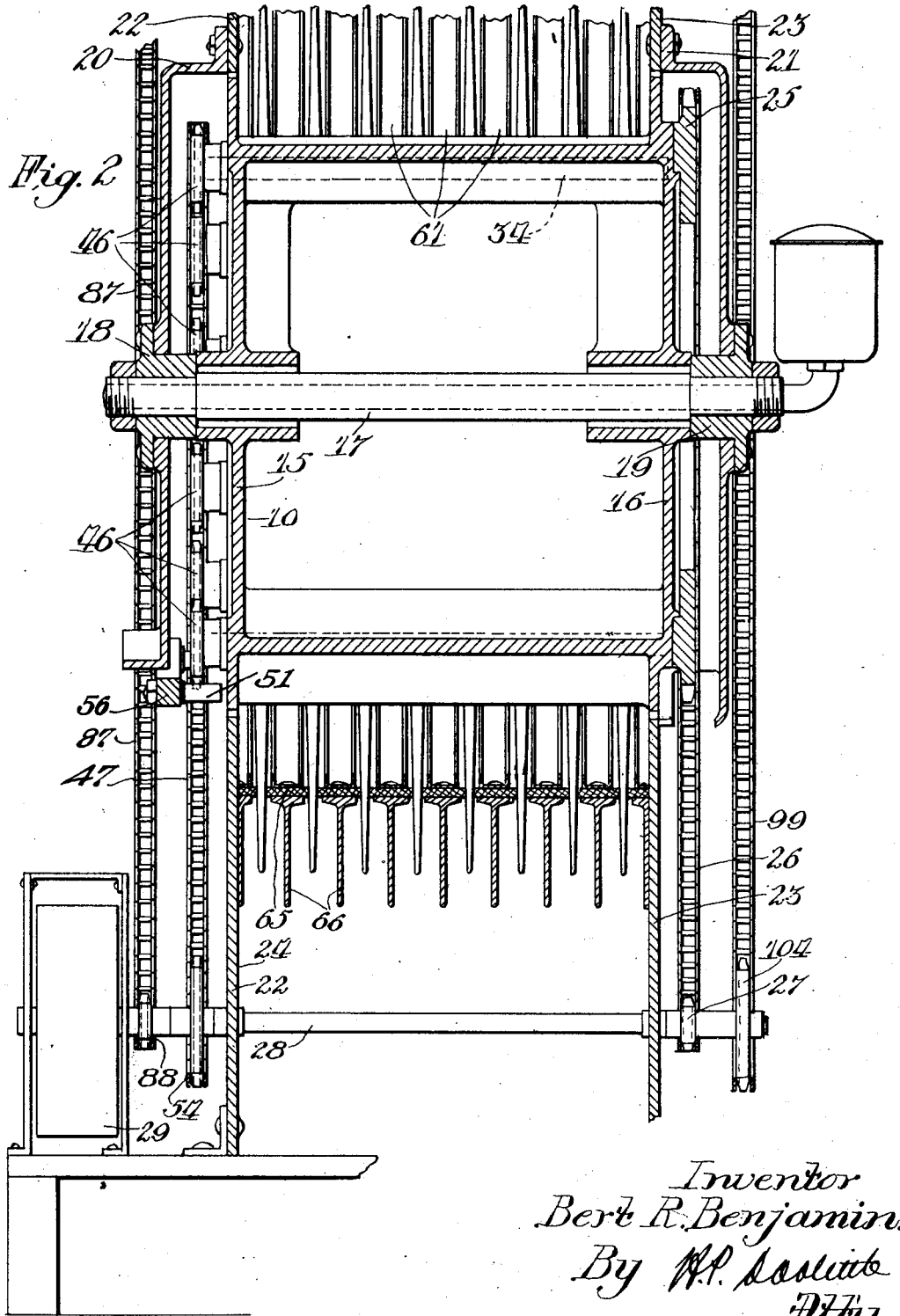

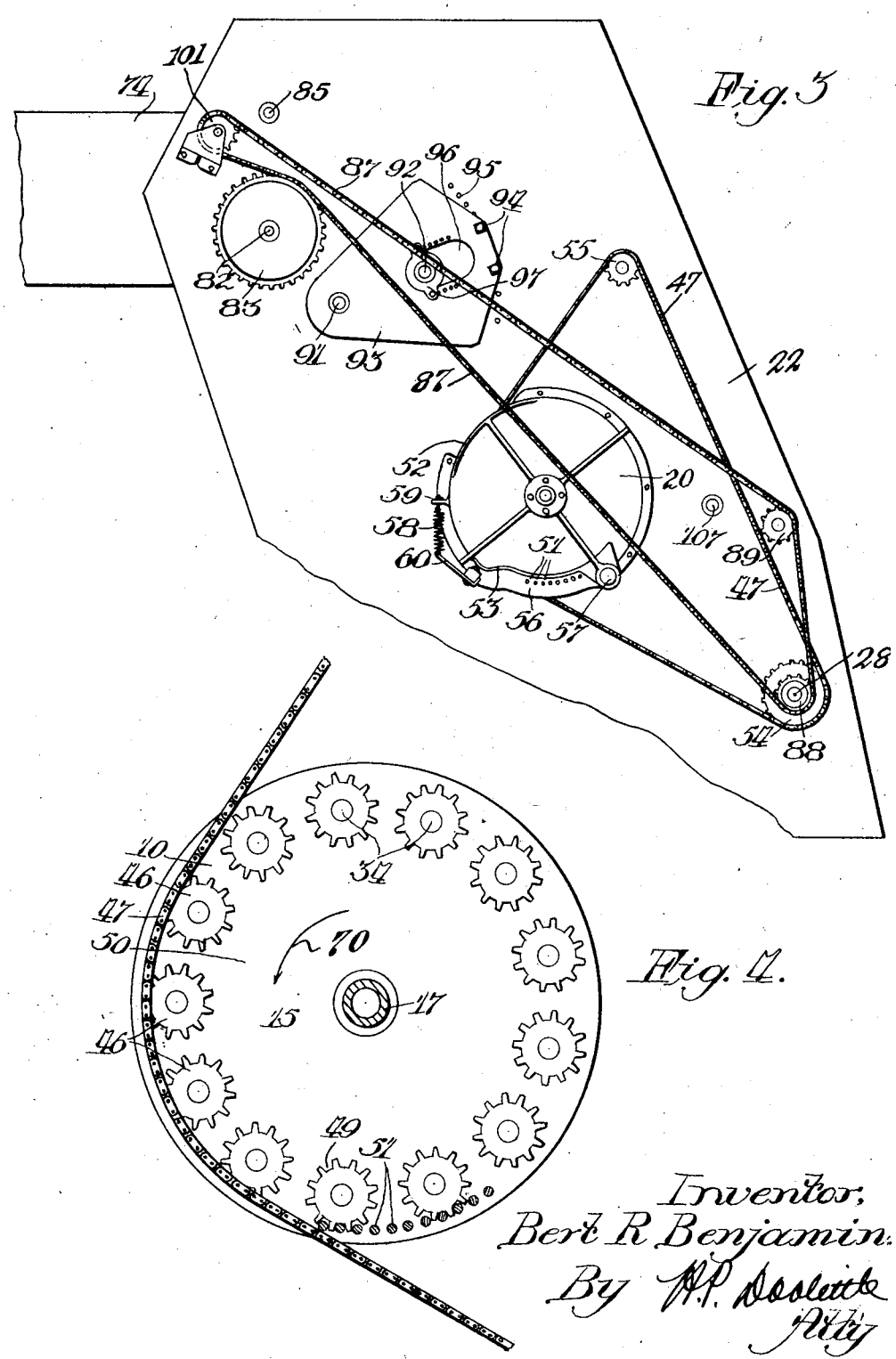

Patented Apr. 16, 1929.

1,709,553

UNITED STATES PATENT OFFICE.

BERT R. BENJAMIN, OF OAK PARK, ILLINOIS, ASSIGNOR TO INTERNATIONAL HARVESTER COMPANY, A CORPORATION OF NEW JERSEY.

COTTON SEPARATOR.

Application filed June 9, 1927. Serial No. 197,551.

This invention relates to cotton treating machines and more particularly to machines for removing lint from bolls which have been harvested by a stripper.

An object of the invention is to provide a novel mechanism which will advantageously act upon stripped cotton to separate the lint from the leaves and stalk parts of cotton bolls or bollies.

It is also an object of the invention to provide a cotton treating machine having a spindle drum carrying rotating spindles for winding up cotton lint and separating it from the other parts of the bolls and bollies.

A further object of the invention is to provide a cotton separator having a feeder, the parts of which have differential velocities so that they will act to crush cotton bolls as well as feed them toward the picker drum.

A further object of the invention is to provide a cotton separator with spindles and a feeder so inclined to radial lines that crushed cotton bolls will be impaled upon the spindle by reason of being thrown thereagainst by the elements of the feeder.

Other objects of the invention will appear as the following description proceeds.

An illustrative embodiment constructed in accordance with the teachings of this invention is shown in the accompanying drawings, in which:

Figure 1 is a view somewhat in the nature of a vertical section, showing the relationship of the spindles and the feeder of the illustrative machine;

Figure 2 is a vertical section taken approximately on the section line 2—2 of Figure 1;

Figure 3 is a partial elevation, showing one side of the machine with the operating mechanisms for its various elements;

Figure 4 is a detail elevation showing one end of the spindle drum, the pinions and belt for driving the spindles so that they will wind up the cotton, and the reversing mechanism for changing the direction of rotation of the spindles so that the cotton can be readily removed therefrom;

Figure 5 is in general an end elevation of the spindle drum with a portion of the end of the drum broken away to show the particular manner in which the spindles are mounted in the drum; and Figure 6 is a sectional view, showing in detail the arrangement of elements whereby a pair of adjacent spindles are mounted and driven.

In general, the illustrative machine may be said to comprise two main parts. The first of these is the separator herein shown as the spindle drum 10, and the second is the feeder for delivering cotton to the separator. The feeder as here shown comprises a conveyer 11, the upper breaker 12, and two lower breakers 13 and 14.

The cotton separator, or spindle drum, is generally in the shape of a hollow, cylindrical body herein illustrated as a casting having opposed heads 15 and 16 through which a spindle drum driving shaft 17 extends. The spindle drum is preferably keyed to the shaft so that it must rotate therewith. The shaft 17 is preferably arranged in horizontal position and is mounted at its end in journals 18 and 19, which are secured respectively to guard casings 20 and 21. As illustrated in Figure 2 of the drawings, these guard casings are secured to the side walls 22 and 23 of the main body of the machine. The contour of the opposite side walls is indicated in Figure 1 at 24.

Fixed to the spindle drum within the guard casing 21 is a large sprocket wheel 25 which is rotated by means of a sprocket chain 26 trained thereover and also over a small driving sprocket 27 non-rotatively mounted upon the driving shaft 28. As illustrated in Figure 2 of the drawings, the shaft 28 is journaled in the side walls 22 and 23 near the base of the machine and is provided with a belt pulley 29 through which power may be initially applied to the machine and all of its driven parts.

As illustrated in Figures 1 and 5 of the drawings, the spindle drum is provided with a large number of spindles which project outwardly beyond the periphery of the drum along lines which bear a uniform inclined relation to lines which are radial with respect to the ends of the drum. The periphery of the drum between its heads 15 and 16 is such that it provides a series of connected ledges, there being two rows of picker stems extending from the drum along each ledge. Such ledges are shown in detail in Figure 5 at 30, 31, and 32. Some of the ledges, such as the intermediate ledge 31, are strengthened by radial fins, such as that illustrated at 33. Each ledge houses a spindle driving shaft 34 preferably journaled at either end in a drum head. At intervals along each driving shaft 34, the adjacent ledge is hollowed out to provide a gear casing for the driving connections between a pair of spindles and the shaft. Such an arrangement of elements is illustrated in Figure 6 of the drawings wherein a pair of spindles 35 and 36 are shown.

Referring to Figure 6, the spindles 35 and 36 extend through the ledge 31 and are journaled at their rearward ends in bushings 37 and 38, which are removably mounted in the spindle drum. Forwardly of these bushings a pinion 39 surrounds each spindle and is non-rotatively connected thereto by a pin 40 extending through the spindle. This pin preferably engages in an axial slot 41 in the pinion. Each pinion has two of such slots formed diametrically opposite each other. A single driving pinion 42 upon the shaft 34 meshes with each of a pair of pinions to rotate the spindles 35 and 36. The spindles are held in the positions indicated in Figure 6, by means of collars 43 which preferably have a pressed fit upon the spindles. These collars are engaged by screw-threaded caps 44 which are removably mounted within screw-threaded bores in the spindle drum, as clearly indicated in the drawings. Between the rearward ends of some of the spindles, the casing in which a series of three pinions is mounted is connected with the main reservoir within the spindle drum by a lubricant passage 45.

The shafts 34, at one end of the spindle drum, extend beyond the spindle drum head 15 and have driving sprocket wheels or pinions 46 fixed thereon. Referring to Figure 4 of the drawings, a sprocket chain 47 contacts with a desired number of the sprocket wheels 46 for giving the spindles forward or "winding-up" rotation so that they may properly act upon the cotton thrown against the drum in the throat 48. It will be seen that four of the sprocket wheels 46 are in contact with the chain 47 in Figure 4 of the drawings. The spindles carried by the shafts of these four sprocket wheels are passing through the throat 48 of the machine and the cotton lint is being wound upon those spindles and separated from the leaves and the other parts of the cotton bolls. The drum is moving in the direction of the arrow 70, and consequently each sprocket wheel 46 is moved around until it comes into the position indicated at 49, wherein it is disengaged from the sprocket chain 47 and acted upon by fixed reversing teeth 51, which cause the direction of the rotation of the spindles to be reversed, as will be clearly seen. The pinions 46 are housed within the guard casing 20, which has openings at the positions indicated at 52 and 53 in Figure 3 of the drawings, for the purpose of permitting the driving belt, or sprocket chain, 47 to be maintained in contact with the desired number of sprocket wheels. The belt 47 passes over a driving sprocket 54 fixed upon the shaft 28 and over an idler sprocket 55.

The reversing teeth 51, as particularly shown in Figure 2 of the drawings, are formed as inwardly extending pins mounted in a support 56, the nature of which is indicated in Figure 3. This support is preferably pivoted upon a trunnion 57 carried by the guard casing 20. The other end of the support is held in its uppermost position by a spring 58 fixed at 59 to the casing 20. Interposed between the lower end of the spring and the support 56 is an arm 60 fixed to the support. Breakage of the reversing teeth 51 or the teeth of the sprockets 46 is prevented by the above described resilient mounting of the arm 56.

On its forward side, the spindle drum is substantially enclosed by bars 61. A row of these bars is arranged upon the supporting rod 62, this rod supporting the bars at their upper ends. At their lower ends, the bars 61 are supported by cross-rods 63 and 64, which are preferably anchored in the side walls of the machine. The lower parts of the bars 61 act as strippers to remove the cotton which has become wound upon the spindles. This operation is enhanced by securement of fabric strips 65 against the outer surface of the arms. Outwardly of the strips 65 T-shaped bars 66 are fixed, so that they combine with the bars 61 and the strips 65 to form rigid structures. The upper portions of the bars 61 operate to form a wall along one side of the throat 48, this wall of the throat supporting spring devices 67 herein shown as flat leaf springs, so arranged as to promote the winding-up of the cotton lint upon the spindles 35 and 36. As illustrated in Figure 1 of the drawings, the opposite wall 68 of the throat 48 is provided with vertical rows of downwardly extending spring devices 69, which cooperate with the springs 67 in promoting the winding-up of all the cotton lint upon the spindles.

As will be seen from an inspection of Figure 1 of the drawings, as the spindle drum rotates in the direction of the arrow 70, the spindles are drawn across the strips 65. In effect, the spindles, because of their inclination to radial lines, are pulled through an opening between adjacent strips 65. It will be seen that as a spindle passes the position 71, it begins to be pulled through the grating formed by the strips 65 and that, when the same spindle reaches the position indicated at 72, it has been almost completely pulled through the openings between those strips. The wound-up lint of the cotton is thus removed from the spindles and allowed to drop to the floor of the machine at the right of the partition 73. This stripping or doffing of the machine is promoted by the angularity of the spindles relative to radial lines and by the reversal of the direction of rotation of the spindles while they are passing from the position 71 to the position 72, the spiral arrangement of the spindle teeth 35' allowing the wound-up cotton to be easily removed. It is during this portion of the cycle of operation of the spindles that their driving sprockets 46 contact with the reversing teeth 51.

Arranged at one end of the machine is a conveyer trough 74 carrying the endless conveyer 11 and desirably adjustably supported by the members 76, 77 and 78. The conveyer 11 preferably carries spaced projections 79 for effectively engaging the stripped cotton to be fed to the machine. The conveyer is trained around rotatable supports 80 and 81, the latter of which is fixed upon a driving shaft 82 journaled in the side walls of the machine and provided at one end with a driving sprocket 83.

Above the inner end of the conveyer 11 and suitably spaced therefrom is the feeder or breaker 12, herein shown as a cylinder carrying radial projections or blades 84. This breaker is fixed upon a driving shaft 85 journaled in the side walls of the machine and provided at one end with a driving pinion 86. Referring to Figure 3 of the drawings, it will be seen that the conveyer 11 is driven by the sprocket chain 87, trained around a driving sprocket 88 mounted upon the power shaft 28 and idler sprocket 101. A second idler sprocket 89 serves to properly direct the upper run of the belt 87. The breaker 12 is driven by means described below and it travels at a speed much greater than the speed of the conveyer. On account of this relationship of the speeds of these two parts of the machine, the cotton bolls carried along on the conveyer 11 are crushed and torn apart, due to the differential peripheral velocities. The blades of the breaker 12 tend to crush the bolls and partially separate leaves and stalk parts from the lint. It also throws the cotton toward the lower breakers 13 and 14, which are mounted beneath the deflecting plate 90.

The breakers 13 and 14 are mounted upon driving shafts 91 and 92, the latter of which is circumferentially adjustable about the shaft 91 as a center. This adjustment is effected by the plate 93 pivotally mounted upon the shaft 91, as indicated in Figure 3 of the drawings. This plate may be secured to the side wall in any one of various positions by the placing of the securing bolts 94 in any desired pair of the openings 95. The plate 93 is also formed with an opening 96 in which the journal bearing 97 of the shaft 92 may be adjusted for varying the distance between the breakers 13 and 14.

At the side of the machine opposite the side shown in Figure 3 of the drawings, the shaft 91 is provided with a sprocket wheel 98 indicated by dotted lines in Figure 1. This sprocket wheel is driven by an endless chain 99, which is trained over a much smaller sprocket wheel 100 fixed upon the shaft 92. Beyond the sprocket wheel 98, the chain 99 passes over the small sprocket wheel 86 upon the shaft 85 and thence downwardly around idler sprockets 102 and 103. From that point this chain passes around a driving sprocket 104 fixed upon the driving shaft 28. Continuing, the chain 99 extends to and around a belt tightener or idler sprocket 105, and then it is trained over a doffer sprocket 106 fixed upon the shaft 107 of the rotary doffer to be described below. From the sprocket wheel 106 the chain 99 extends to the sprocket wheel 100, the point of beginning.

Effective cleaning of the rotating spindles 35 and the removal of any cotton which may remain upon the spindles after they pass the stationary doffers 65 is secured by the action of a rotary doffer 108. This doffer has a series of narrow radial blades 109, preferably faced by bodies 110 of pliable material which move between adjacent rows of the rotating spindles. This rotating doffer is fixed upon the shaft 107 and driven in the manner above described.

The speed of movement of the chain 109 is such as to cause the shaft 85 to move at a much higher speed than the shaft 82, for reasons which have been above referred to. Similar differential velocities obtain as to the rotation of the breakers 13 and 14. The sprocket wheel 100 upon the shaft of the breaker 14 is much smaller than the sprocket wheel 98 on the shaft of the breaker 13, and consequently the peripheral velocity of the breaker 14 is much greater than that of the breaker 13. This action promotes the opening of the cotton bolls and the breaking of the bolls and whatever parts of cotton stalks as may be fed into the machine. Furthermore, the arrangement of the breakers 13 and 14 and their relative speeds is such that cotton bolls are thrown toward the spindle drum in the direction of the arrow 115. This action promotes the impaling of the cotton bolls by the rotating spindles and thereby enables the machine to remove a high percentage of the cotton fiber from the stripped cotton.

A closure plate 111 is mounted above and in proximity to the periphery of the breaker 14. This plate is provided with slots 112 in order that the plate may be held in any position to which it is adjusted, the bolts 113 being tightened to hold the plate in such position.

Whenever the shaft of the breaker 14 is moved farther away from the shaft of the breaker 13, it is necessary to elevate the plate 111 in order to prevent its interference with the operation of the breaker 14.

An important feature of the illustrative machine is its improved operation resulting from the inclination of the spindles to radial lines. This arrangement increases the capacity and effectiveness of the machine, promoting thorough separation of the cotton lint and the other parts of the bolls and facilitating effective doffing of the lint from the spindles.

While the invention has been described with reference to a particular structure, it is to be understood that it is not necessarily limited thereto but that it is of a scope commensurate with the breadth of the appended claims.

What is claimed as new is:

1. A cotton treating machine comprising, in combination, a rotary lint separator having spindles rotatable relative thereto and extending at an angle to radial lines, and a feeder for delivering material to the separator.

2. A cotton treating machine comprising, in combination, a rotary lint separator drum having independently rotatable spindles projecting therefrom, and a boll crusher acting to throw cotton toward the separator.

3. A cotton treating machine comprising, in combination, a lint separator including a carrier supported for orbital movement, axially rotating spindles on the carrier set at an angle to radial lines for effectively engaging cotton bolls, and a feeder for delivering cotton to said spindles.

4. A cotton treating machine comprising, in combination, a lint separator including a rotating drum carrying axially rotatable spindles inclined substantially to radial lines, and a boll feeder delivering cotton bolls to the separator.

5. A cotton treating machine comprising, in combination, a lint separator including a rotatable drum carrying axially rotatable spindles protruding therefrom at angles to radial lines, and cotton delivery means acting to impel cotton bolls toward the separator in the direction of the axes of the spindles.

6. A cotton treating machine comprising, in combination, a stationary casing, a rotatable cylinder journaled upon a horizontal axis in the casing, rotatable spindles carried by the casing so as to project outwardly therefrom at small angles to radial lines, shafts journaled in the cylinder and rotatable with respect thereto for rotating the spindles, means for rotating the cylinder, means for rotating a predetermined number of said shafts, walls secured to the casing so as to form a passageway for directing cotton to the spindles, and rotatable means located in said passageway for throwing cotton bolls toward the cylinder substantially in the direction of the lengths of the spindles passing the middle of the passageway so that the bolls are impaled on the spindles.

7. A machine for acting upon stripped cotton to separate the cotton fiber therefrom comprising axially rotating spindles and a plurality of doffing devices successively engaging the spindles for removing cotton fiber from the spindles.

8. A cotton separator for removing cotton fiber from stripped cotton comprising a rotary carrier, axially rotating spindles extending therefrom at angles to radial lines, a stationary doffer acting to remove cotton from the spindles, and a movable doffer acting upon the spindles after they have passed the stationary doffer.

9. A machine for separating cotton fiber from stripped cotton comprising a rotary carrier, axially rotating spindles extending therefrom at angles to radial lines, and a plurality of successively acting doffers for removing the cotton fiber from the spindles.

10. A cotton extracting machine comprising axially rotating spindles for collecting the lint or fiber, means for feeding stripped cotton to said spindles, and a doffer for removing the lint from the spindles, the doffer having a pliable body substantially engaging two adjacent rows of spindles.

11. A cotton separator comprising axially rotating spindles for collecting the cotton fiber, means for projecting stripped cotton toward the separator, and a doffer for removing the cotton fiber from the spindles, the doffer comprising a composite body having a part made of pliable material and substantially engaging two adjacent rows of spindles.

12. In a cotton treating machine, axially rotating spindles for collecting the cotton lint, a feeder for delivering stripped cotton to the spindles, a rotary carrier, means for mounting the spindles on the carrier in circular rows with the individual spindles extending at angles to radial lines, and a doffer for removing cotton from the spindles, said doffer comprising a body of pliable material contacting with the spindles and more rigid backing member for the pliable body.

13. In a cotton separator, axially rotating spindles for winding up and collecting the cotton fiber, spring devices for forcing cotton into contact with the spindles, a feeder for delivering material to the spindles, means for mounting the spindles in cylindrical arrangement with their axes at angles to radial lines, and a doffer for removing cotton from the spindles.

14. A cotton separator comprising, in combination, a spindle drum, axially rotatable spindles carried by the drum at an angle to lines extending radially of the drum, cotton feeding means for throwing cotton in the direction of the axes of the spindles so that the cotton will be impaled on the spindles, doffing means for removing cotton from the spindles, and spring devices for causing all of the cotton fed to the spindles to be acted upon by them.

15. A machine for treating stripped cotton to separate the lint from the hulls comprising, in combination, a rotatable body, toothed spindles carried by the body in projecting positions, means carried by the body for rotating the spindles upon their own axes to wind up cotton lint thereon, means for rotating the body, means for feeding cotton to the body so that the spindles will come in contact therewith, and means for stripping wound up cotton lint from the spindles.

16. A means for treating stripped cotton to separate the cotton lint from the hulls and stalks comprising, in combination, a movable body, toothed spindles projecting from the body and carried thereby, means carried by the body for rotating the spindles on their own axes to wind up cotton lint thereon, means for moving the body to bring the spindles successively past a position at which they come in contact with stripped cotton, means for feeding stripped cotton toward the body in a direction substantially coincident with the direction of the spindles at their cotton receiving positions, relatively stationary means for contacting with the hulls to hold them against movement with the wound up lint, and means for stripping the wound up cotton lint from the spindles.

In testimony whereof I affix my signature.

BERT R. BENJAMIN.